Oct. 17, 1961 E. W. SPEARS, JR., ET AL 3,004,385
VARIABLE CONVERGENT-DIVERGENT JET NOZZLE
Filed June 25, 1958 6 Sheets-Sheet 1

INVENTORS
Esten W. Spears, Jr. &
William T. Given III
BY Paul Fitzpatrick
ATTORNEY

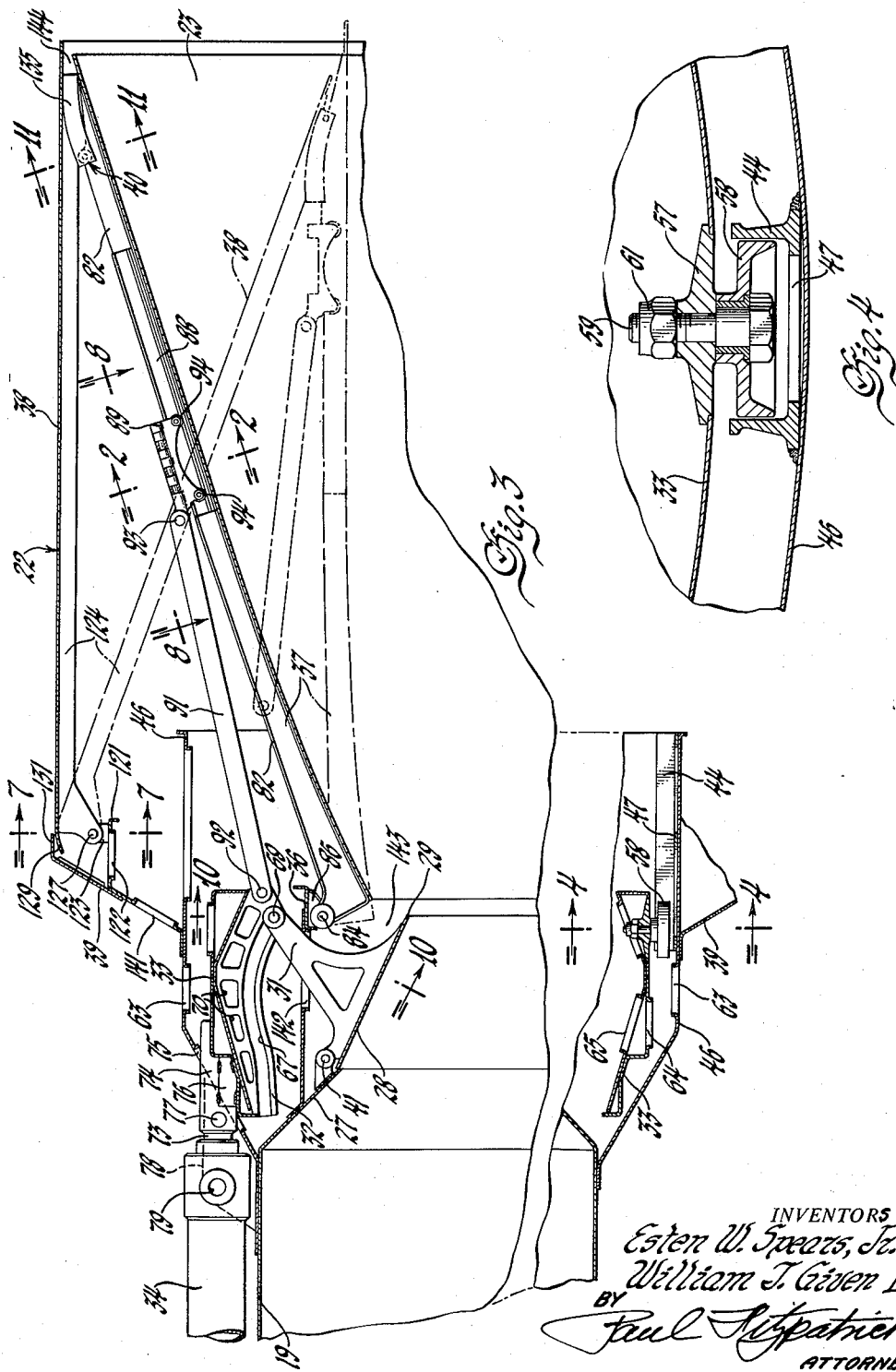

Oct. 17, 1961   E. W. SPEARS, JR., ET AL   3,004,385
VARIABLE CONVERGENT-DIVERGENT JET NOZZLE
Filed June 25, 1958   6 Sheets-Sheet 3
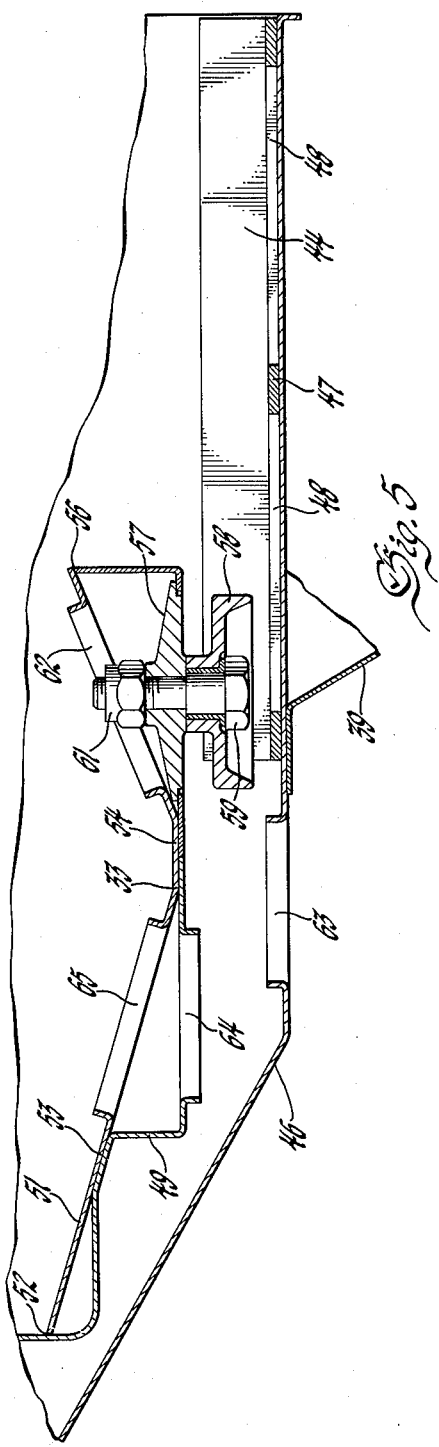
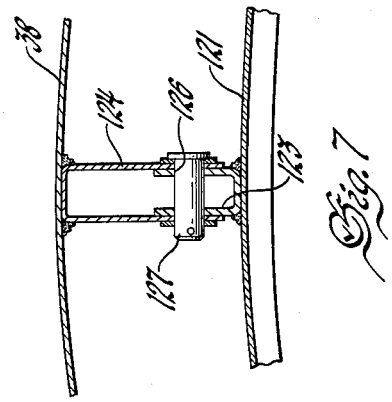
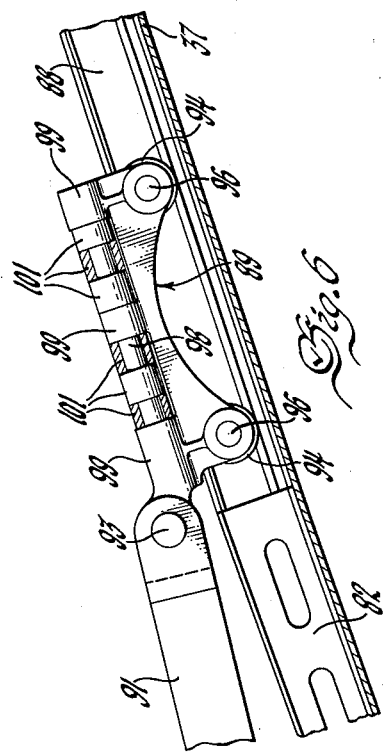
INVENTORS
Esten W. Spears, Jr. &
William T. Given III
BY
Paul Fitzpatrick
ATTORNEY

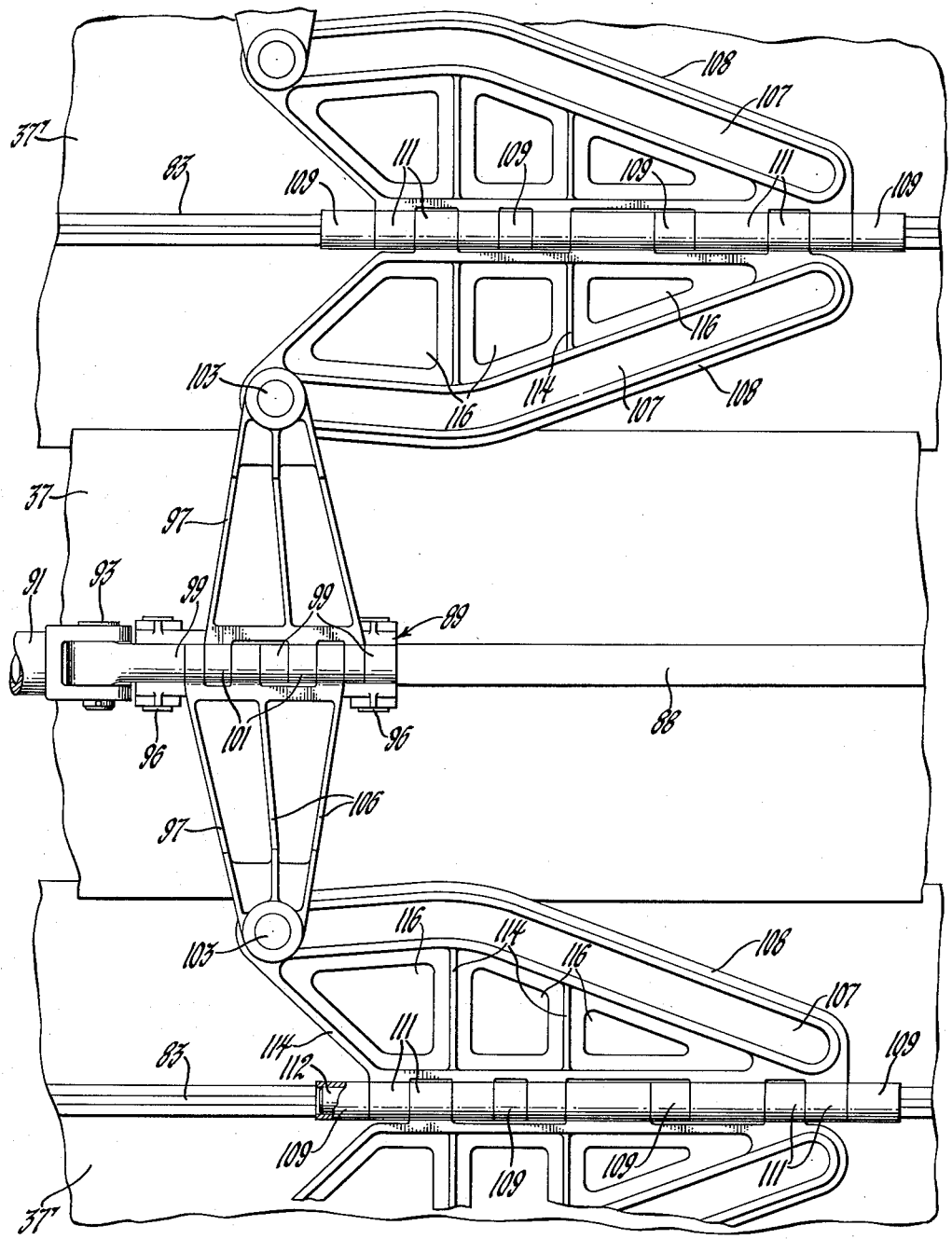

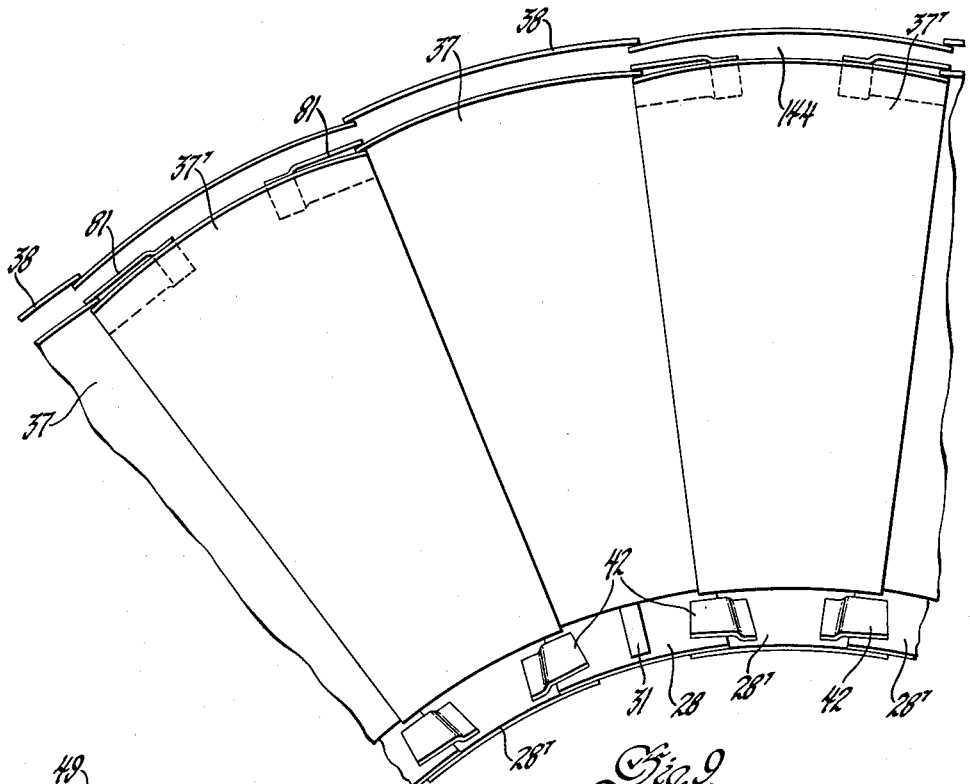

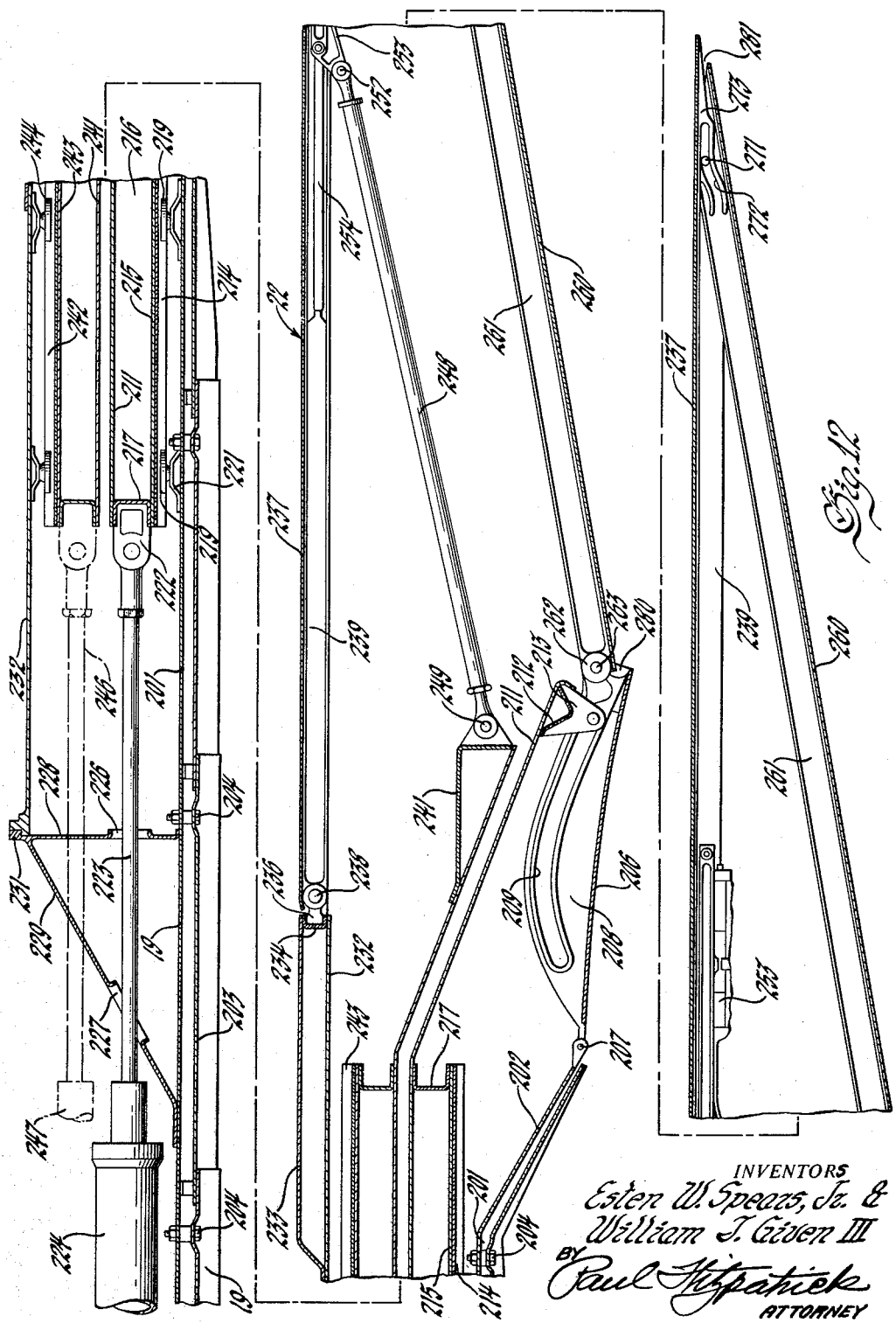

3,004,385
VARIABLE CONVERGENT-DIVERGENT
JET NOZZLE
Esten W. Spears, Jr., and William T. Given III, Indianapolis, Ind., assignors to General Motors Corporation, Detroit, Mich., a corporation of Delaware
Filed June 25, 1958, Ser. No. 745,797
6 Claims. (Cl. 60—35.6)

Our invention relates to propulsion nozzles for jet engines and is particularly directed to a variable convergent-divergent nozzle for turbojet engines designed for high speed flight. The principal object of the invention is to provide improved variable nozzle structure which provides a variable nozzle throat or convergent portion, variable exit portion which may vary from substantially uniform diameter to a considerably divergent condition, and a variable fairing which streamlines the exhaust end of the engine and changes diameter in accordance with the variation of exit area of the nozzle. Another object is to improve the cooling of such structures. Further objects of the invention are to provide improved structure for varying the area of jet nozzles and fairings therefor, and to provide nozzle structures which are particularly adapted for aircraft jet engine use by virtue of light weight and simple and reliable structure.

The nature of the invention and the advantages thereof will be apparent to those skilled in the art from the succeeding detailed description and accompanying drawings of preferred embodiments of the invention.

FIGURE 1 is a schematic drawing illustrating the application of the invention to a turbojet aircraft propulsion installation.

FIGURES 2 to 11, inclusive, illustrate a first embodiment of the invention.

FIGURE 3 is a sectional view, with parts cut away, taken on planes containing the axis of the engine.

FIGURE 4 is a detail sectional view taken on the plane indicated by the line 4—4 in FIGURE 3.

FIGURE 5 is an enlarged view of the lower portion of FIGURE 3.

FIGURE 6 is an enlarged view of a portion of FIGURE 3 illustrating the exit flap actuating mechanism.

FIGURE 7 is a fragmentary sectional view of the pivot for the fairing flaps taken on the plane indicated by the line 7—7 in FIGURE 3.

FIGURE 8 is a plan view of the actuating mechanism for the exit flaps taken on the plane indicated by the line 8—8 in FIGURE 3.

FIGURE 9 is a partial rear elevation view of the exit end of the nozzle.

FIGURE 10 is a sectional view illustrating the actuating mechanism for the throat flaps, taken on the plane indicated by the line 10—10 in FIGURE 3.

FIGURE 11 is a fragmentary sectional view illustrating the connection between the downstream ends of the exit and fairing flaps, taken on the plane indicated by the line 11—11 in FIGURE 3.

FIGURE 12 is a longitudinal section of a second embodiment of the invention taken on a plane containing the axis of the nozzle, showing only structure above the axis.

Figure 1:
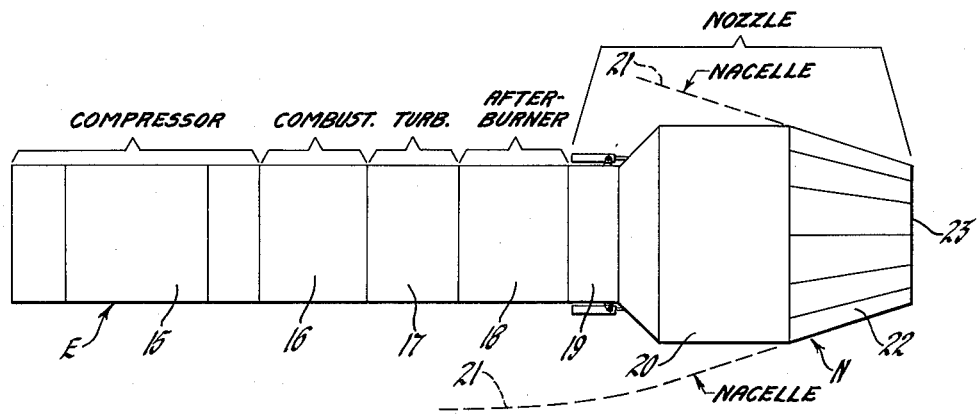

Referring first to FIGURE 1, which illustrates schematically the environment and application of a nozzle according to the invention, a turbojet engine E of known type comprises a compressor 15, combustion apparatus 16, a turbine 17, and a turbine exhaust pipe 18 having an afterburner therein connecting to a variable jet nozzle assembly N according to the invention. The nozzle assembly may include a portion 19 which is a continuation of the exhaust pipe and an enlarged shroud 20. The engine is mounted in a nacelle or fuselage, indicated by the broken lines 21, from which the rear variable fairing portion 22 of the nozzle projects. The propulsive jet issues from the rear end of the nozzle assembly at 23.

Referring now to FIGURE 3 for a general description of the nature of one form of the variable jet nozzle, it will be noted that the exhaust pipe 19 terminates in a short converging section 27. A ring of overlapping throat flaps 28 and 28' only one of which is illustrated in FIGURE 3 (see also FIGURE 9), define a further converging section terminating in the nozzle throat at the rear edge 29 of flaps 28. There are twenty-four throat flaps 28, as illustrated. Alternate ones of these flaps, which may be termed master flaps 28 are rigid with actuating arms 31 extending outwardly from the flaps. Cam followers on the outer ends of these arms engage cams 32 fixed to an actuating ring 33 movable axially of the nozzle by a number of power cylinders 34.

The fixed structure also includes a shroud 36 mounted on the convergent portion 27. Twenty-four exit flaps 37 and 37' (FIGURE 9) are pivoted to the shroud 36. These flaps overlap to provide an annular exit section of the nozzle which may be varied from the divergent condition illustrated in solid lines in FIGURE 3 to a condition of substantially uniform diameter illustrated by the broken lines. The exit flaps are coupled by mechanism to be described to the movable actuating ring 33 for movement inward and outward by this ring. Movement of ring 33 thus adjusts flaps 28, 28' to vary the throat area of the nozzle and also flaps 37, 37' to vary the exit area.

In order to minimize boattail drag at the exhaust end 23 of the nozzle, the fairing means 22 is provided. This is defined by a ring of twenty-four overlapping fairing flaps 38, the upstream ends of which are pivoted on a ring 39 fixed to the exhaust pipe 19. The downstream ends of the fairing flaps are coupled to the exit flaps by track and roller means 40 so that the fairing flaps move in and out with the exit flaps. When the exit flaps are in their closed (minium area) position, the fairing flaps provide a streamlined contour for air flow over the exhaust end of the engine.

We may now proceed to a fuller description of the preferred structure of the nozzle. To avoid unnecessary repetition, it may be assumed that structures which are rigidly connected are, in general, welded together unless they are described as assembled in some other way.

Beginning with the throat portion of the nozzle, the master flaps 28 and slave flaps 28' (FIGURES 3 and 9) are pivoted to the exhaust pipe 19 by hinges 41 which include brackets fixed to the convergent portion 27. The hinge portion of the master flaps may be integral with the actuating arm 31. That of the slave flaps may be any suitable hinge eye. Clips 42 extend from the slave flaps 28' over the exterior of the master flaps 28 adjacent the rear edge thereof. These clips assure that the slave flaps will follow the master flaps, particularly in the absence of pressure in the exhaust duct. Under engine operating conditions, the pressure in the duct will hold the slave flaps outwardly against the master flaps, which overlie them.

The actuating ring 33 is guided in its movement axially of the nozzle by four tracks 44 (FIGURES 3, 4 and 5) spaced 90° apart around the axis of the nozzle and fixed to a fixed shroud 46 which is an extension of the exhaust pipe 19 and of slightly greater diameter. The tracks 44 are of channel section, including a web 47 which is cut away as indicated at 48 for weight reduction. The actuating ring 33 comprises an outer ring 49 and an inner ring 51 welded together in the areas indicated at 52, 53, 54 and 56, and otherwise spaced to provide a rigid structure of light weight.

Four bosses 57 fixed to the ring 49 provide a mounting for wheels or rollers 58 which are received between the flanges of track 44. Each roller 58 is mounted for rotation on a stepped bolt 59 retained by a nut 61. Flanged lightening holes 62 provide access to the nut 61 and additional lightening holes 63, 64, and 65 distributed around the shroud 46 and rings 49 and 51 also permit air circulation. It will be apparent that the four sets of tracks 44 and rollers 58 maintain actuating ring 33 concentric with the exhaust pipe 19. They also permit relative radial expansion of the parts due to temperature.

Proceeding now to the connection between the cams 32 and throat flaps 28, with particular reference to FIGURE 10, the twelve cams 32 are fixed to the inner wall 51 of ring 33 and coact with followers mounted on the outer ends of actuating arms 31 fixed to the master flaps 28. The cam 32 has tracks 67 on each face within which travel rollers 68 mounted on pins 69. Pins 69 are retained on the clevised end 71 of arm 31 by the cross pins 72. It will be seen that the structure provides positive operation of flaps 28 and, thereby, of slave flaps 28'. The structure is shown in FIGURE 3 with rings 33 at its forward limit of travel. If desired, a cam 32 and arm 31 may be provided for each throat flap. Cams 32 may be forgings with lightening holes 70 in the webs thereof.

The actuating ring 33 is moved axially of the nozzle by four cylinders 34 spaced 90° apart around the nozzle. The piston rod 73 of each cylinder is coupled to the ring through a sleeve 74 which is aligned with a hole 75 in the shroud 46 and is fixed to the ring. Gusset plates 76 on each side of the sleeve strengthen the attachment. Piston rod 73 projects into the sleeve and is attached to it by a pin 77. The cylinder 34 is attached to the exhaust pipe 19 by means of two brackets 78 extending outwardly from the exhaust pipe portion 19 and 46 on each side of the cylinder. Bosses projecting from the cylinder are provided with tapped holes 79 which receive cap screws which extend through openings in the brackets 78 at each side of the cylinder. Any suitable means (not illustrated) may be provided to control the operation of the cylinders 34 to move the ring 33 to any desired position in its range of movement. The means for controlling the operation of the cylinders is immaterial to the present invention.

Figure 2:
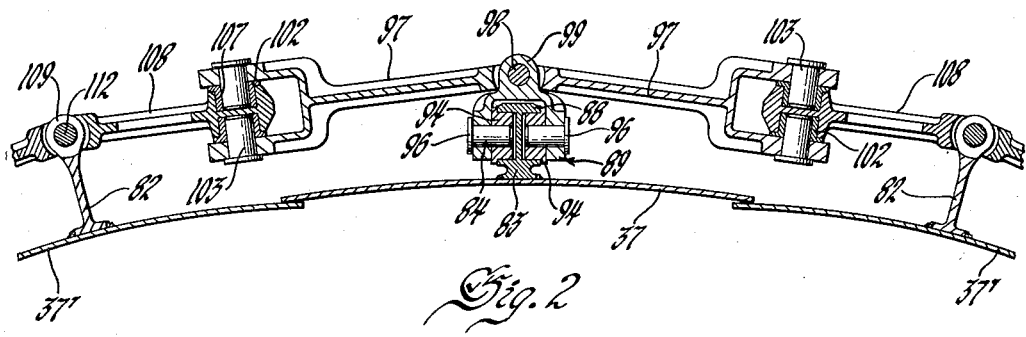
FIGURE 2 is a section through a portion of the variable nozzle actuating mechanism taken on a plane transverse to the axis of the engine indicated by the line 2—2 in FIGURE 3.

For the structure and mounting of the exit flaps 37, 37', refer particularly to FIGURES 3, 9 and 11. These flaps are all slightly curved sheet metal plates or staves. There are no flaps which may be properly regarded as master or slave flaps on the exit nozzle structure, as will be clear when the actuating mechanism for these flaps is described. Alternate flaps 37 overlie intermediate flaps 37'. Clips 81 fixed on the outlet ends of flaps 37' overlie the edges of flaps 37 to insure concurrent movement of the flaps. The upstream ends of flaps 37 and 37' are similarly hinged to the fixed shroud 36. The flaps 37 and 37' are fixed to forged stiffening ribs 82 and 83 (see FIGURES 2 and 3). The forward ends of these ribs are bored to coact with hinge pins 84 mounted in brackets 86 fixed to the inner surface of shroud ring 36. It will be seen that the structure and mounting of the exit flaps is similar to that of the throat flaps, but that the exit flaps are very much longer.

The mechanism by which the exit diameter of the nozzle is varied is illustrated in FIGURES 2, 3, 6 and 8. It comprises coacting members which provide a ring of interconnected parts around the exit nozzle. The circumference of the ring is varied by axial movement of certain of the parts which are coupled to the actuating ring 33 for movement thereby. A portion of the stiffening rib 82 of the flaps 37 constitutes a rail or track 88 of I-beam section. A carriage 89 is guided for forward and aft movement on each track. These carriages are coupled to the ring 33 by connecting rods 91 having pinned pivotal connections 92 and 93 to the actuating ring and carriage, respectively. As will appear from FIGURE 2, the carriage 89 is generally channel or U-shaped in cross-section and carries four flanged rollers 94 which are rotatably mounted on pins 96. The rollers travel in the channels on each side of the rail or track 88. Two arms 97 extending from each side of the carriage are hinged to it by a pin 98 parallel to the track 88. Pin 98 extends through eyes 99 on the carriage and through eyes 101 on the arms 97. The arms 97 are thus constrained to move axially of the nozzle with the carriage but may swing in or out as the diameter of the nozzle changes. The outer ends of the arms 97 are clevised and mount opposed flanged rollers 102 by means of pins 103. The arms 97 are forged parts with stiffening ribs 106.

The rollers 103 travel in opposed cam tracks 107 in opposite faces of cams 108 connected by a hinge arrangement to the intermediate flaps 37'. The structure by which cams 108 are hinged at the flaps is provided by a modification of the intermediate part of stiffening rib 82 to provide bored hinge eyes 109. Hinge eyes 111 extending from the cams 108 and a pin 112 extending through the eyes mount the cams on the flaps 37'. Because of the gas pressure within the flaps 37 and 37' urging them outwardly, the arms 97 and cams 108 will be in tension. The hinge connection provides for correct alignment and smooth cam of the cam and cam follower arms notwithstanding variations in the nozzle area. For the best combination of lightness and strength, the cams 108 are provided with stiffening webs 114 and lightening holes 116.

Proceeding now to the ring of fairing flaps 38 which constitute the fairing 22 of the nozzle, the structure by which these flaps are coupled to the ring 39 fixed to the exhaust pipe is illustrated in FIGURES 3 and 7. An annular ring or flange 121 is a part of ring 39. It is provided with spaced flanged lightening holes 122 and has mounted on it channel section hinge brackets 123. Each fairing flap 38 is fixed to a channel section rib or stiffener 124 extending along the center line of the flap. The forward end of the stiffener 123 projects to provide eyes 126 for a hinge pin 127 extending through holes in the hinge bracket 123. The pin may be secured by a lockwire or other suitable device. It will be noted that the forward end of the flap is curved inwardly at 129 in an arc about the axis of pin 127. This curved surface 129 remains closely adjacent the rearwardly extending flange 131 at the outer end of fixed ring 39 to provide only a constricted path for escape of air between the flaps 38 and ring 131.

The downstream ends of the exit and fairing flaps are coupled together by a track and roller structure 41 illustrated in FIGURES 3 and 11. The curved track 135 is fixed between the flanges of channel stiffening member 124 at the downstream end of the flap 38. Track 135 is of channel section with recurved flanges 136. The stiffening rib 82 of flap 37 (or 83 of flap 37') is cross-drilled to receive a pin 137 which mounts two small rollers 138 which travel within the recurved flanges 136. The track 135 is curved so that the downstream ends of flaps 37 and 38 will remain closer together through their range of movement. When the exit flaps are moved in and out by the mechanism described, the fairing flaps move with them to eliminate any blunt area at the exhaust outlet which would create undesirable drag.

In view of the very high temperatures of the propulsive gases which flow through the nozzle, it is important that adequate provision for cooling it be made. With the engine mounted in the usual way in a fuselage or nacelle, it is mounted in a chamber to which air is admitted under positive pressure, ordinarily ram pressure developed by the forward movement of the vehicle. This air ordinarily flows around the engine and may exhaust in part from the nacelle around the exterior of the variable nozzle. Some of the air is admitted into the nozzle structure and flows through it to cool the parts. Referring to FIGURE 3, the nacelle structure encloses the nozzle of FIGURE 3 forwardly of flange 39. Air from within the nacelle flows into the nozzle structure through openings 63 and 75 in ring 46 and openings 141 in ring 39. Some of this air may flow through the openings 64 and 65 in actuating ring 33 and around the front and rear edges of the ring, and through the openings 142 in fixed ring 36 through which actuating arms 31 project. This air circulation cools the actuating ring, cams, follower arms, and throat flaps. The ram pressure of the air, which will ordinarily be higher than the pressure of the air in the nozzle throat 29 during high speed flight, may force some of the air out through the gap 143 between the throat and exit flaps. The ejector action of the propulsive jet issuing from the throat may draw air through gap 143 regardless of speed. The air issuing through the gap 143 cools the throat flaps and forms, to some extent, a layer of cool air over the inner surface of the exit flaps.

The cooling air also flows rearwardly through the space between the exit and fairing flaps and is discharged through the annular gap 144 between the rear ends of these flaps. The movement of this air may be created both by the ram pressure and by the ejector action of the propulsive jet issuing at 23. The exit flaps are thus cooled both by the blanket of air on the inner surface and by the air flowing over the outer surface thereof. It will be understood, of course, that the temperature of the parts remains high and that material suitable for high temperature use will be required, but the circulation of air greatly reduces the temperature and thereby improves the life and reliability of the parts.

Considering now the mode of operation of the nozzle assembly of FIGURE 3, since the diameters of the throat and exit are controlled concurrently by the single actuating ring 33, a single schedule of variation of areas of these two is provided. The schedule may be fitted to the needs of a particular installation by proper configuration of the cam tracks 67 and 107. FIGURE 3 shows the actuating ring 33 in its extreme forward position corresponding to normal high speed, high altitude flight of an aircraft embodying the invention. Before take-off, the ring 33 would be in its rearward position, the throat flaps would be in approximately the position shown, and the exit flaps in the position shown by broken lines. The followers 68 would be at the forward end of cam track 67 and the followers 102 at the forward end of tracks 107.

After take-off as the aircraft increases speed, the actuating ring will be removed forwardly, slightly increasing the throat diameter and greatly increasing the exit diameter, providing the proper configuration for high speed climb. Further movement of the ring slightly increases the exit area and decreases the throat area to slightly less than its initial value, providing the proper configuration for high speed cruise at altitude. Because of the fixed position of the forward end of the exit flaps, this nozzle configuration is not adapted to large variation in the throat area. In the particular nozzle illustrated, taking the area with the ring 33 all the way to the rear as 100, the area increases to about 112 during forward travel, then decreases to about 96 when the ring 33 is fully forward. The exit area varies from about 138 when the ring is in its rearward position to about 400, or about four times the initial throat area. The exit area increases rapidly during approximately 60% of the stroke of the actuating ring, more slowly for about the next 20%, and then remains constant during the final portion of the travel of the actuating ring during which the throat is decreased to its minimum value.

It will be apparent that a wide variety of schedules suited to particular requirements can be set up by varying the configuration of the cam tracks 67 and 107.

The form of variable exhaust nozzle illustrated in FIGURE 12 performs generally the same functions as the nozzle previously described and is similar in many respects in structure. For this reason, the structures are not described with the detail with which they have been described in connection with the first embodiment. The principal difference between the two nozzles lies in the fact that the nozzle of FIGURE 12 has provisions for independent variation of the throat and exit areas. There are other differences of structure which will be pointed out. Referring to FIGURE 12, the exhaust duct 19 which may house the afterburner is defined by an outer wall 201 terminating in a converging section 202. A liner or inner shroud 203 made up of sections secured to the wall 201 by bolts 204 isolates the outer wall 201 to some extent from the heat of the gases in the exhaust pipe. Cooling air may be circulated between the walls 201 and 203.

A number of throat flaps 206 are pivoted by hinges 207 to the outlet end of exhaust pipe 201. Any suitable number of flaps may be used, but it is contemplated in this form that the converging portion of the nozzle consist of forty-eight flaps 206, half of which are slave flaps alternating with master flaps. Each master flap 206 has fixed to it a flange 208 defining a cam track 209. The throat diameter is varied by an actuating ring 211 movable axially of the nozzle and terminating in a stiffening ring 212 and cam follower brackets 213 which carry cam rollers movable in the cam tracks 209. It will be noted that the follower is shown at the rear end of the track and that forward movement of the follower, because of the contour of the cam track, will close the nozzle throat. The ring 211 is guided for movement axially of the nozzle by a mechanism similar to that which guides the actuating ring 33 shown in FIGURE 3. Preferably, six channel section tracks 214 are mounted on an inner wall 215 of ring 211 connected to ring 211 by radial webs 216 and channel-section rings 217. The track 214 is guided for reciprocation by two rollers 219 mounted on brackets 221 fixed to the outer surface of wall 201. The rollers engage the flanges of channel tracks 214 and have radial clearance to permit radial expansion of the exhaust pipe 201 relative to the actuating ring 211.

Six fittings 222 fixed to the forward end of ring 211 provide for attachment of rods 223 coupled to the pistons (not shown) of actuating cylinders 224 distributed around the exhaust pipe. The forward ends of these cylinders are coupled to the exhaust pipe by suitable brackets (not shown). When the cylinder moves the piston rod forward, the nozzle throat is closed. Rods 223 pass through openings 226 and 227 in a radial flange 228 and a conical flange 229, respectively, these flanges being fixed to the outer surface of the exhaust pipe. Flanges 228 and 229 strengthen the exhaust pipe and also provide a bolting flange 231 to which is attached an outer fixed shroud 232. The rear end of shroud 232 is of double walled construction, being provided with an outer wall 233 in addition to the shroud wall 232. The walls 232 and 233 are joined at their rear end by a channel ring 234 mounting hinge brackets 236 to which preferably forty-eight fairing flaps 237 are connected by hinge pins 238. The fairing flaps, similar to those previously described, are a set of overlapping sheet metal plates, each including a rib or stiffener 239. The fairing flaps 237 are connected to actuating means to vary the exit diameter of the fairing. This diameter is varied independently to some extent of the throat diameter by axial movement of an actuating ring 241. Ring 241 is guided for movement in the outer shroud 232 by means identical to that previously described by which the ring 211 is guided, comprising six tracks 242 on the outer ring 243 of the actuating ring, each track 242 being guided by rollers 244 rotatably mounted on the outer shroud 232. The piston rods 246 of six actuating cylinders 247 disposed circumferentially between the cylinders 224 move the ring 241 axially. These rods extend through holes similar to holes 226 and 227. Ring 241 is shown at its rearward limit of movement. The fairing flaps are adjusted by a mechanism of the same type as that by which the exit flaps are adjusted on the previously described form. Twenty-four rods 248 pivoted by pins 249 to brackets on the rear end of ring 241 are connected by pins 252 to carriages 253 reciprocable on tracks 254 on each alternate fairing flap. The carriages have arms extending from them which move followers in tracks on cams fixed to the intermediate flaps, the mechanism being the same in all significant respects as that previously described and shown most clearly in FIGURE 8. A duplication of the depiction and illustration of this structure is deemed unnecessary. The contour of the cam tracks is such that forward movement of ring 241 decreases the exit diameter of the fairing flaps 237.

In this form of the apparatus, the exit flaps 260 are carried at their forward ends by the throat flaps 206 and are coupled at their rear or outlet ends to the fairing flaps 237. The exit flaps thus float, the diameter at the forward end being determined by the throat flaps (actuating ring 211), and the diameter at the exhaust end being determined by the fairing flaps (actuating ring 241). The exit flaps 260 are provided with longitudinally extending ribs or stiffeners 261. The forward ends of the ribs 261 provide hinge eyes 262 coupled by pins 263 to the rear end of cam 208 of the master flaps 206 and to similar structure providing hinge eyes on the intermediate throat flaps.

The rear ends of the exit and fairing flaps are coupled by suitable track means so that these move in and out together and can shift axially of the engine with respect to each other. As illustrated in FIGURE 12, a pin 271 extending from the rib 261 of the exit flap travels in a track 272 defined by a slot in a member 273 fixed to the fairing flaps.

The form of nozzle illustrated in FIGURE 12 not only provides for more flexible operation because of the provision for independent variation of throat and exit areas; it is also adapted to greater variation of the throat area, since the forward end of the exit flaps moves inwardly with the throat flaps. The nozzle is shown in FIGURE 12 with both the throat and exit areas at their maximum values. In the particular structure illustrated, the throat diameter is reduced to somewhat less than 7/10 of its maximum value and thus the throat area may be reduced by slightly more than ½. The exit area may be varied over a diameter range of 2 to 1 and thus an area range of almost 4 to 1. The minimum area of the exit is intermediate between the maximum and minimum values of the throat. By this independent control, the nozzle is adapted to an engine which may operate at varying power levels as, for example, with varying degrees of afterburner fuel ratio. The nozzle in FIGURE 12 might be operated in the following manner: For take-off with full afterburning, the throat would be near its open position shown and the exit flaps would be closed to the point that the exit portion of the nozzle is of substantially constant diameter. As the aircraft speed increases, the exit portion of the nozzle would be opened to provide greater expansion and velocity of the propulsive jet. For high speed cruise at high altitude, fuel would be reduced, the throat would be closed to near its minimum opening, and the exit would be opened to near maximum extent to provide approximately a 4 or 5 to 1 area ratio from the throat to the exit. The means by which the areas are controlled are immaterial to the invention. Such control may be either manual or automatic in response to suitable factors.

The nozzle structure of FIGURE 12 is cooled in a manner similar to that of FIGURE 3. Ram air from within the nacelle may enter the space between exhaust pipe 201 and shroud 232 through holes 227 and 226 and the corresponding holes for actuating rods 246. Some of this air will be forced or drawn through the gap at 280 between the throat and exit flaps and some will flow between the exit and fairing flaps and exhaust through the gap between them at 281.

It will be seen that the nozzle structures according to the invention provide particularly light weight structures. The structure of FIGURE 3 is lighter in weight but less flexible than that of FIGURE 12. The mechanism illustrated particularly in FIGURE 8 by which the area of the nozzle exit is varied is particularly suitable for the purpose. It exerts a force on all of the flaps near the middle of the span of the flaps and acts as a contracting hoop which takes the pressure load exerted on the flaps by the exhaust gases. The actuating mechanism is easy to control, involving merely fore and aft movement of a controlling member, and the structures are such as to be well adapted to withstand the high temperatures and buffeting encountered in jet nozzle installations.

The description of preferred embodiments of this invention for the purpose of explaining the principles thereof is not to be construed as limiting or restricting the invention, since many modifications may be made by the exercise of skill in the art without departing from the scope of the invention.

We claim:

1. A variable nozzle mechanism comprising, in combination, a gas duct having an outlet, a ring of overlapping flaps connected to the duct adjacent the outlet for concurrent radial swinging movement of the flaps, an actuating ring extending around the duct adjacent the outlet and movable axially of the duct, each alternate flap having a track thereon extending longitudinally of the flap, a carriage reciprocable on each track, two arms on each carriage each pivoted thereto for swinging movement about an axis parallel to the corresponding track, each remaining flap having two cams thereon each pivoted thereto for swinging movement about an axis extending longitudinally of the flap, the arms including cam followers engaging the cams of the adjacent flaps, and means coupling each carriage to the actuating ring for reciprocation therewith.

2. A variable nozzle mechanism comprising, in combination, a gas duct having an outlet, a ring of overlapping nozzle flaps connected to the duct adjacent the outlet for concurrent radial swinging movement of the flaps to define a variable nozzle, an actuating ring extending around the duct adjacent the outlet and movable axially of the duct, each alternate flap having a track thereon extending longitudinally of the flap, a carriage reciprocable on each track, two arms on each carriage each pivoted thereto for swinging movement about an axis parallel to the corresponding track, each remaining flap having two cams thereon each pivoted thereto for swinging movement about an axis extending longitudinally of the flap, the arms including cam followers engaging the cams of the adjacent flaps, and means coupling each carriage to the actuating ring for reciprocation therewith.

3. A variable nozzle mechanism comprising, in combination, a gas duct having an outlet, a ring of overlapping fairing flaps connected to the duct adjacent the outlet for concurrent radial swinging movement of the flaps to define a variable fairing, an actuating ring extending around the duct adjacent the outlet and movable axially of the duct, each alternate flap having a track thereon extending longitudinally of the flap, a carriage reciprocable on each track, two arms on each carriage each pivoted thereto for swinging movement about an axis parallel to the corresponding track, each remaining flap having two cams thereon each pivoted thereto for swinging movement about an axis extending longitudinally of the flap, the arms including cam followers engaging the cams of the adjacent flaps, and means coupling each carriage to the actuating ring for reciprocation therewith.

4. A variable convergent-divergent jet nozzle comprising, in combination, a gas duct having an outlet, means defining a convergent nozzle section terminating in a throat, means coupled to the covergent nozzle section for varying the area of the throat, an actuating ring extending around the duct adjacent the outlet movable axially of the duct, a shroud ring fixed to the duct adjacent the outlet, a ring of overlapping fairing flaps pivoted on the shroud ring adjacent the outlet for concurrent radial swinging movement of the flaps to define a variably convergent fairing, a ring of overlapping exit flaps having upstream ends coupled to the duct adjacent the said throat and having downstream ends coupled to the downstream ends of the fairing flaps, and means coupling the actuating means to the fairing and exit flaps for concurrent radial swinging actuation of the fairing and exit flaps to vary the exit area of the nozzle, comprising a track on each alternate flap of one said ring of flaps extending longitudinally of the flap, a carriage reciprocable on each track, two arms on each carriage, two cams on each remaining flap of the said one ring, the arms including cam followers engaging the cams of the adjacent flaps, and means coupling each carriage to the actuating ring for reciprocation therewith.

5. A variable convergent-divergent jet nozzle comprising, in combination, a gas duct having an outlet, a ring of overlapping throat flaps pivoted on the duct adjacent the outlet for concurrent radial swinging movement of the flaps to define a variable nozzle throat, an actuating ring extending around the duct adjacent the outlet movable axially of the duct and coupled to the throat flaps so as to move the flaps radially in response to axial movement of the ring, a shroud ring fixed to the duct adjacent the outlet, a ring of overlapping fairing flaps pivoted on the shroud ring adjacent the outlet for concurrent radial swinging movement of the flaps to define a variably convergent fairing, a ring of overlapping exit flaps having upstream ends coupled to the duct adjacent the downstream end of the throat flaps and having downstream ends coupled to the downstream ends of the fairing flaps, and means coupling the actuating ring to the exit flaps for concurrent radial swinging actuation of the exit and fairing flaps to vary the exit area of the nozzle comprising a track on each alternate exit flap extending longitudinally of the flap, a carriage reciprocable on each track, two arms on each carriage each pivoted thereto for swinging movement about an axis parallel to the corresponding track, each remaining exit flap having two cams thereon each pivoted thereto for swinging movement about an axis extending longitudinally of the flap, the arms including cam followers engaging the cams of the adjacent flaps, and means coupling the carriage to the actuating ring for reciprocation therewith.

6. A variable convergent-divergent jet nozzle comprising, in combination, a gas duct having an outlet, a ring of overlapping throat flaps pivoted on the duct adjacent the outlet for concurrent radial swinging movement of the flaps to define a variable nozzle throat, an actuating ring extending around the duct adjacent the outlet movable axially of the duct, a shroud ring fixed to the duct adjacent the outlet, a ring of overlapping fairing flaps pivoted on the shroud ring adjacent the outlet for concurrent radial swinging movement of the flaps to define a variably convergent fairing, a ring of overlapping exit flaps having upstream ends pivoted adjacent the downstream end of the throat flaps and having downstream ends coupled to the downstream ends of the fairing flaps, and means coupling the actuating ring to the fairing flaps for concurrent radial swinging actuation of the fairing and exit flaps to vary the exit area of the nozzle comprising a track on each alternate fairing flap extending longitudinally of the flap, a carriage reciprocable on each track, two arms on each carriage each pivoted thereto for swinging movement about an axis parallel to the corresponding track, each remaining fairing flap having two cams thereon each pivoted thereto for swinging movement about an axis extending longitudinally of the flap, the arms including cam followers engaging the cams of the adjacent flaps, and means coupling the carriage to the actuating ring for reciprocation therewith.

References Cited in the file of this patent

UNITED STATES PATENTS

| | | |
|---|---|---|
| 2,780,056 | Colley | Feb. 5, 1957 |
| 2,796,731 | Morley et al. | June 25, 1957 |
| 2,840,984 | Laucher | July 1, 1958 |
| 2,923,127 | Biehl et al. | Feb. 2, 1960 |

FOREIGN PATENTS

| | | |
|---|---|---|
| 750,307 | Great Britain | June 13, 1956 |